US012733055B2

(12) United States Patent
Saitou et al.

(10) Patent No.: US 12,733,055 B2
(45) Date of Patent: Sep. 8, 2026

(54) BIOMEDICAL DATA RELAY DEVICE AND BIOMEDICAL-DEVICE WIRELESS COMMUNICATION SYSTEM

(71) Applicant: Murata Manufacturing Co., Ltd., Kyoto (JP)

(72) Inventors: Hiroki Saitou, Kyoto (JP); Shuto Kimura, Kyoto (JP); Takaya Sano, Kyoto (JP); Koji Tanaka, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 286 days.

(21) Appl. No.: 18/402,977

(22) Filed: Jan. 3, 2024

(65) Prior Publication Data

US 2024/0224363 A1 Jul. 4, 2024

(30) Foreign Application Priority Data

Jan. 4, 2023 (JP) ................................ 2023-000232

(51) Int. Cl.

| | |
|---|---|
| ***H04W 76/18*** | (2018.01) |
| ***H04W 52/02*** | (2009.01) |
| *H04W 88/04* | (2009.01) |

(52) U.S. Cl.

CPC ....... *H04W 76/18* (2018.02); *H04W 52/0251* (2013.01); *H04W 88/04* (2013.01)

(58) Field of Classification Search

CPC .. H04W 76/18; H04W 52/0251; H04W 88/04

USPC .......................................................... 455/111

See application file for complete search history.

(56) References Cited

U.S. PATENT DOCUMENTS

| | | | | |
|---|---|---|---|---|
| 2013/0162160 | A1* | 6/2013 | Ganton | H05B 45/20 315/210 |
| 2023/0049540 | A1 | 2/2023 | Ichikawa et al. | |

FOREIGN PATENT DOCUMENTS

| | | | |
|---|---|---|---|
| JP | H06-504245 | A | 5/1994 |
| JP | H09-033647 | A | 2/1997 |
| JP | 2011-067292 | A | 4/2011 |
| JP | 2022-179371 | A | 12/2022 |
| WO | 2021/215342 | A1 | 10/2021 |

* cited by examiner

*Primary Examiner* — Eugene Yun

(74) *Attorney, Agent, or Firm* — McDonald Hopkins LLC

(57) ABSTRACT

A biomedical data relay device includes a first communication unit, an output unit, and a first controller. The first communication unit is capable of receiving biometric information from a biomedical device through wireless communication. The output unit is capable of outputting biometric information to a display. The output unit outputs, in a case where the first communication unit loses wireless communication with the biomedical device, the received biometric information to the display. The first controller counts a first time period in which the first communication unit is in a state of being unable to communicate wirelessly with the biomedical device. The first controller maintains a power-on state in a case where wireless communication becomes available before the first time period reaches a first specified time period, which is predetermined.

9 Claims, 5 Drawing Sheets

BIOMEDICAL DATA RELAY DEVICE AND BIOMEDICAL-DEVICE WIRELESS COMMUNICATION SYSTEM

CROSS REFERENCE TO RELATED APPLICATION

This application claims priority from Japanese Patent Application No. 2023-000232 filed on Jan. 4, 2023. The content of this application is incorporated herein by reference in its entirety.

BACKGROUND OF THE DISCLOSURE

1. Field of the Disclosure

The present disclosure relates to a biomedical data relay device and a biomedical-device wireless communication system.

2. Description of the Related Art

A conversion adapter described in International Publication No. 2021/215342 receives biometric information by communicating wirelessly with a biometric sensor. The conversion adapter outputs the biometric information to a biometric information monitor. Moreover, the conversion adapter includes a wireless communication unit. The wireless communication unit makes a connection with a specific biometric sensor in accordance with the strength of received radio waves.

BRIEF SUMMARY OF THE DISCLOSURE

A conversion adapter such as that described in International Publication No. 2021/215342 is sometimes used in emergency situations such as surgery. In such a case, it is desirable that the conversion adapter keep outputting biometric information so that the user can check the biometric information when necessary. On the other hand, a conversion adapter such as that described in International Publication No. 2021/215342 may temporarily lose wireless communication with the biological sensor. When a wireless connection is disconnected, the conversion adapter attempts to reconnect. If a situation where a connection with the biometric sensor is not established persists, the battery power is consumed accordingly. The power consumption may cause the battery to run out of power, and the conversion adapter may no longer be able to maintain notification of biometric information. Therefore, the present disclosure aims to provide a configuration that can suppress battery power consumption while leaving the possibility of reconnection even in a case where wireless communication is disconnected.

In order to solve the above-described problems, the present disclosure is a biomedical data relay device including a first battery that supplies power, a first communication unit capable of receiving, through wireless communication, biometric information from a biomedical device that acquires the biometric information, an output unit capable of outputting the biometric information received by the first communication unit to another external device different from the biomedical device, and a first controller that controls switching between a power-on state and a power-off state. The first controller controls, in a case where the first communication unit loses wireless communication with the biomedical device, the output unit so as to output the received biometric information to the external device, and counts a first time period in which the first communication unit is in a state of being unable to communicate wirelessly with the biomedical device, maintains the power-on state in a case where wireless communication becomes available before the first time period reaches a first specified time period, which is predetermined, and performs switching from the power-on state to the power-off state to stop outputting the biometric information to the external device in a case where the first time period becomes longer than or equal to the first specified time period.

Moreover, in order to solve the above-described problems, the present disclosure is a biomedical-device wireless communication system including a biomedical device that acquires biometric information, and a biomedical data relay device capable of wirelessly communicating with the biomedical device. The biomedical data relay device includes a first battery that supplies power, a first communication unit capable of receiving the biometric information from the biomedical device through wireless communication, an output unit capable of outputting the biometric information received by the first communication unit to another external device different from the biomedical device, and a first controller that controls switching between a power-on state of the biomedical data relay device and a power-off state of the biomedical data relay device. The biomedical device includes a second battery that supplies power, a second communication unit capable of transmitting the acquired biometric information through wireless communication, and a second controller that controls switching between a power-on state of the biomedical device and a power-off state of the biomedical device. The biomedical device counts a second time period in which the second communication unit is in a state of being unable to communicate wirelessly with the biomedical data relay device, remains in the power-on state in a case where wireless communication becomes available before the second time period reaches a second specified time period, which is predetermined, and switches from the power-on state to the power-off state on a condition that the second time period becomes longer than or equal to the second specified time period. The biomedical data relay device controls, in a case where the first communication unit loses wireless communication with the biomedical device, the output unit so as to output the received biometric information to the external device, and counts a first time period in which the first communication unit is in a state of being unable to communicate wirelessly with the biomedical device, remains in the power-on state in a case where wireless communication becomes available before the first time period reaches a first specified time period, which is predetermined, and switches from the power-on state to the power-off state to stop outputting the biometric information to the external device in a case where the first time period becomes longer than or equal to the first specified time period.

With each of the configurations described above, the output unit outputs biometric information to the external device even when the first communication unit loses wireless communication with the biomedical device. That is, display of the biometric information is secured for the external device. Furthermore, in a case where the first time period in which the data relay device is in the state of being unable to communicate wirelessly with the biomedical device becomes longer than or equal to the first specified time period, the data relay device enters the power-off state. Thus, a situation does not occur in which the data relay device keeps outputting biometric information to the external device for an excessively long period of time even though the data relay device does not receive biometric information from the biomedical device. The data relay device remains in the power-on state in a case where the data relay device reconnects with the biomedical device before the first time period in which the data relay device is in the state of being unable to communicate wirelessly with the biomedical device reaches the first specified time period. Thus, the data relay device can be prevented from switching to the OFF state unnecessarily.

It is possible to inform biometric information to the user and reduce the power consumption of data-centric devices, while leaving the possibility of reconnection.

DETAILED DESCRIPTION OF THE DISCLOSURE

In the following, embodiments of a biomedical data relay device and a biomedical-device wireless communication system are described with reference to the drawings. In the following description, a biomedical-device wireless communication system including a biomedical data relay device is used as an example.

Figure 1:
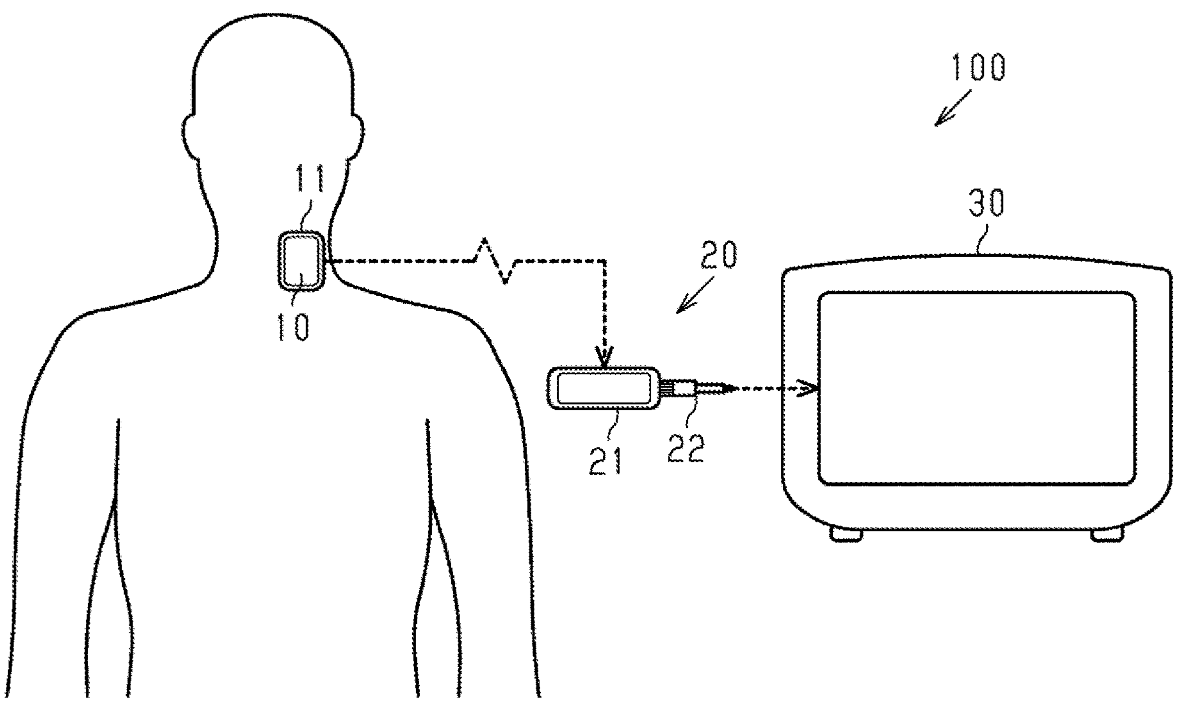
FIG. 1 is a schematic diagram of a biomedical-device wireless communication system.

As illustrated in FIG. 1, a biomedical-device wireless communication system 100 includes a biomedical device 10, a data relay device 20, and a display 30.

The biomedical device 10 is used by being attached to a subject to be measured. For example, the biomedical device 10 is attached to a subject to be measured with an attaching sheet 11 interposed therebetween. The biomedical device 10 acquires biometric information regarding the subject to be measured. Examples of the subject to be measured include hospitalized patients and persons undergoing surgery. In the present embodiment, the biometric information is body temperature. In this manner, the biomedical device 10 serves as a sensor to detect biometric information. The biomedical device 10 continuously detects and continuously acquires body temperature. Note that the term "continuously acquires" here includes acquiring body temperature multiple times at predetermined time intervals. Note that the number of biomedical devices 10 is not limited to one and may by more than one.

The biomedical device 10 can wirelessly communicate with the data relay device 20. The biomedical device 10 can transmit biometric information through wireless communication. Note that the wireless communication method is, for example, Bluetooth®.

Figure 2:
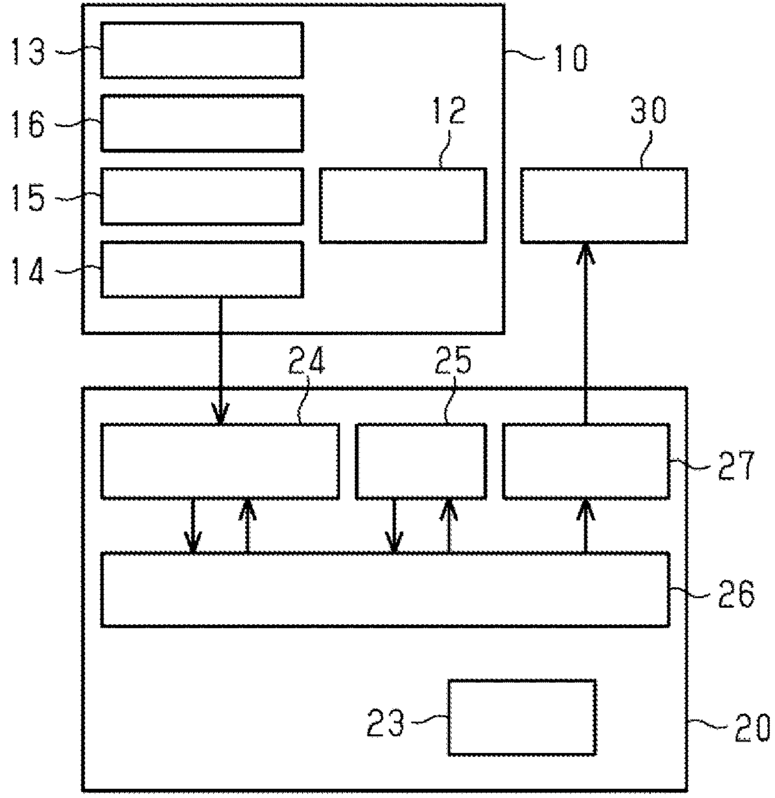
FIG. 2 is a schematic configuration diagram of a biomedical device and a data relay device.

As illustrated in FIG. 2, the biomedical device 10 includes a second battery 12, a temperature sensor 13, a second communication unit 14, a second storage unit 15, and a second controller 16. The second battery 12 supplies power to electronic devices inside the biomedical device 10, such as the temperature sensor 13, the second communication unit 14, the second storage unit 15, and the second controller 16. The temperature sensor 13 detects the temperature of the living body, which is the subject to be measured, as the body temperature. The second communication unit 14 can transmit the acquired biometric information to the data relay device 20 through wireless communication.

The second storage unit 15 is a storage medium that can be read by the second controller 16. The second storage unit 15 stores various processes executed by the second controller 16 in the form of program data. The second storage unit 15 also stores, in advance, various control values necessary for the various processes executed by the second controller 16. Furthermore, the second storage unit 15 can store biometric information as data. Note that the biometric information is data in which the body temperature serving as a detected value is associated with the time at which the body temperature is detected.

The second controller 16 is circuitry that includes one or more processors. Note that the second controller 16 may be one or more dedicated hardware circuits, such as an application-specific integrated circuit (ASIC), or circuitry including a combination of such hardware circuits. The second controller 16 performs various processes, such as communication using the second communication unit 14, writing and reading data to and from the second storage unit 15, and so on. In particular, the second controller 16 controls switching between the power-on state of the biomedical device 10 and the power-off state of the biomedical device 10. Note that the power-off state includes a so-called sleep state, which is a case where the biomedical device 10 does not transmit biometric information to the data relay device 20, for example. In a case where the biomedical device 10 is not in the sleep state but is completely in the power-off state, the biomedical device 10 is switched to the power-on state by using a switch or the like, which is not illustrated, of the biomedical device 10. Although not illustrated, the biomedical device 10 also includes peripheral circuits, such as a power supply circuit and a clock circuit.

As illustrated in FIG. 1, the data relay device 20 can receive biometric information from the biomedical device 10 through wireless communication. The data relay device 20 is for biomedical use. The data relay device 20 includes a main body case 21 and an output terminal 22. The output terminal 22 is connectable to the display 30.

The data relay device 20 can communicate with the display 30 by means of the output terminal 22 connected to the display 30. The data relay device 20 outputs the received biometric information to the display 30 through the output terminal 22.

As illustrated in FIG. 2, the data relay device 20 includes a first battery 23, a first communication unit 24, a first storage unit 25, a first controller 26, and an output unit (e.g., output controller) 27. The first battery 23 supplies power to electronic devices inside the data relay device 20, such as the first communication unit 24, the first storage unit 25, the first controller 26, and the output unit 27. The first communication unit 24 can receive biometric information from the biomedical device 10 through wireless communication.

The first storage unit 25 is a storage medium that can be read by the first controller 26. The first storage unit 25 stores various processes executed by the first controller 26 in the form of program data. The first storage unit 25 also stores, in advance, various control values necessary for the various processes executed by the first controller 26. Furthermore, the first storage unit 25 can store, as data, an OFF time at which the first controller 26 switches the data relay device 20 to the power-off state and ID information for identifying the biomedical device 10 that is in wireless communication immediately before wireless communication is lost.

The first controller 26 is circuitry that includes one or more processors. Note that the first controller 26 may be one or more dedicated hardware circuits, such as an application-specific integrated circuit (ASIC), or circuitry including a combination of such hardware circuits. The first controller 26 performs various processes, such as communication using the first communication unit 24, writing and reading data to and from the first storage unit 25, and so on. In particular, the first controller 26 controls switching between the power-on and power-off states of the power supply of the data relay device 20. As with the power-off state of the biomedical device 10, the power-off state of the data relay device 20 includes a so-called sleep state, which is a case where the data relay device 20 does not receive biometric information or does not output biometric information to, for example, the display 30. In a case where the data relay device 20 is not in the sleep state but is completely in the power-off state, the data relay device 20 is switched to the power-on state by using a switch or the like, which is not illustrated, of the data relay device 20.

The output unit 27 can output biometric information received by the first communication unit 24 to an external device different from the biomedical device 10. In the present embodiment, the external device is the display 30. Note that, although not illustrated, the data relay device 20 also includes peripheral circuits, such as a power supply circuit and a clock circuit.

The display 30 is, for example, a liquid crystal display. The display 30 displays biometric information received from the data relay device 20. Specifically, the display 30 displays the acquired biometric information as, for example, an image illustrating numerical values. The display 30 updates the displayed image of numerical values every time biometric information is received.

About Biomedical Device Control when Wireless Communication is Available

The second controller 16 of the biomedical device 10 performs various processes by executing programs stored in the second storage unit 15 to control the transmission of biometric information. The second controller 16 repeatedly controls the transmission of biometric information in a predetermined control cycle when the power of the biomedical device 10 is in the ON state and wireless communication is performed with the data relay device 20.

Figure 3:
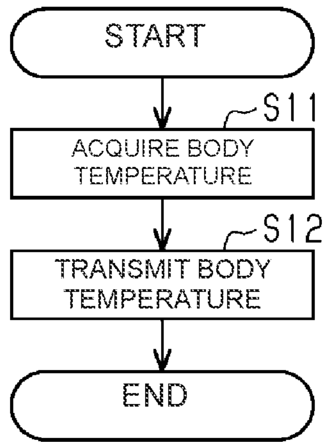
FIG. 3 is a flowchart illustrating a series of processes in biometric information transmission control.

As illustrated in FIG. 3, when the second controller 16 starts biometric information transmission control, the second controller 16 first performs processing in Step S11. In Step S11, the second controller 16 acquires the body temperature of the subject to be measured as a detection value via the temperature sensor 13. The second controller 16 acquires biometric information by associating the body temperature with the detection time of the body temperature. Thereafter, the second controller 16 performs processing in Step S12.

In Step S12, the second controller 16 transmits the acquired biometric information to the data relay device 20 via the second communication unit 14 through wireless communication. Thereafter, one cycle of a series of biometric information transmission control operations performed by the second controller 16 is completed, and the second controller 16 starts the biometric information transmission control again.

About Data Relay Device Control when Wireless Communication is Available

The first controller 26 of the data relay device 20 performs various processes by executing programs stored in the first storage unit 25 to control the reception and output of biometric information. The first controller 26 repeatedly controls the reception and output of biometric information when the power of the data relay device 20 is in the ON state and wireless communication is performed with the biomedical device 10.

Figure 4:
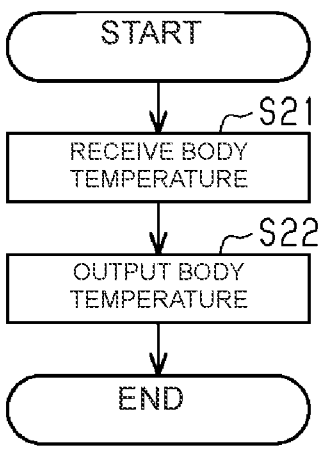
FIG. 4 is a flowchart illustrating a series of processes in biometric information reception-output control.

As illustrated in FIG. 4, when the first controller 26 starts biometric information reception-output control, the first controller 26 first performs processing in Step S21. In Step S21, the first controller 26 controls the first communication unit 24 to receive biometric information from the second communication unit 14 of the biomedical device 10 through wireless communication. Thereafter, the first controller 26 performs processing in Step S22.

In Step S22, the first controller 26 controls the output unit 27 to output the received biometric information to the display 30. As a result, the received biometric information is displayed as an image illustrating numerical values on the display 30. It is sufficient that this display be outputted at least once, and even in a case where the image is not completely displayed, this is considered to be outputted. Thereafter, one cycle of a series of biometric information reception-output control operations performed by the first controller 26 is completed, and the first controller 26 starts the biometric information reception-output control again.

About Biomedical Device Control when Wireless Communication is Unavailable

The second controller 16 of the biomedical device 10 performs various processes by executing programs stored in the second storage unit 15 to perform control for when communication is disrupted. When the biomedical device 10 is in the power-on state and the communication with the data relay device 20 is disconnected, the second controller 16 performs, one time, control for when communication is disrupted.

Figure 5:
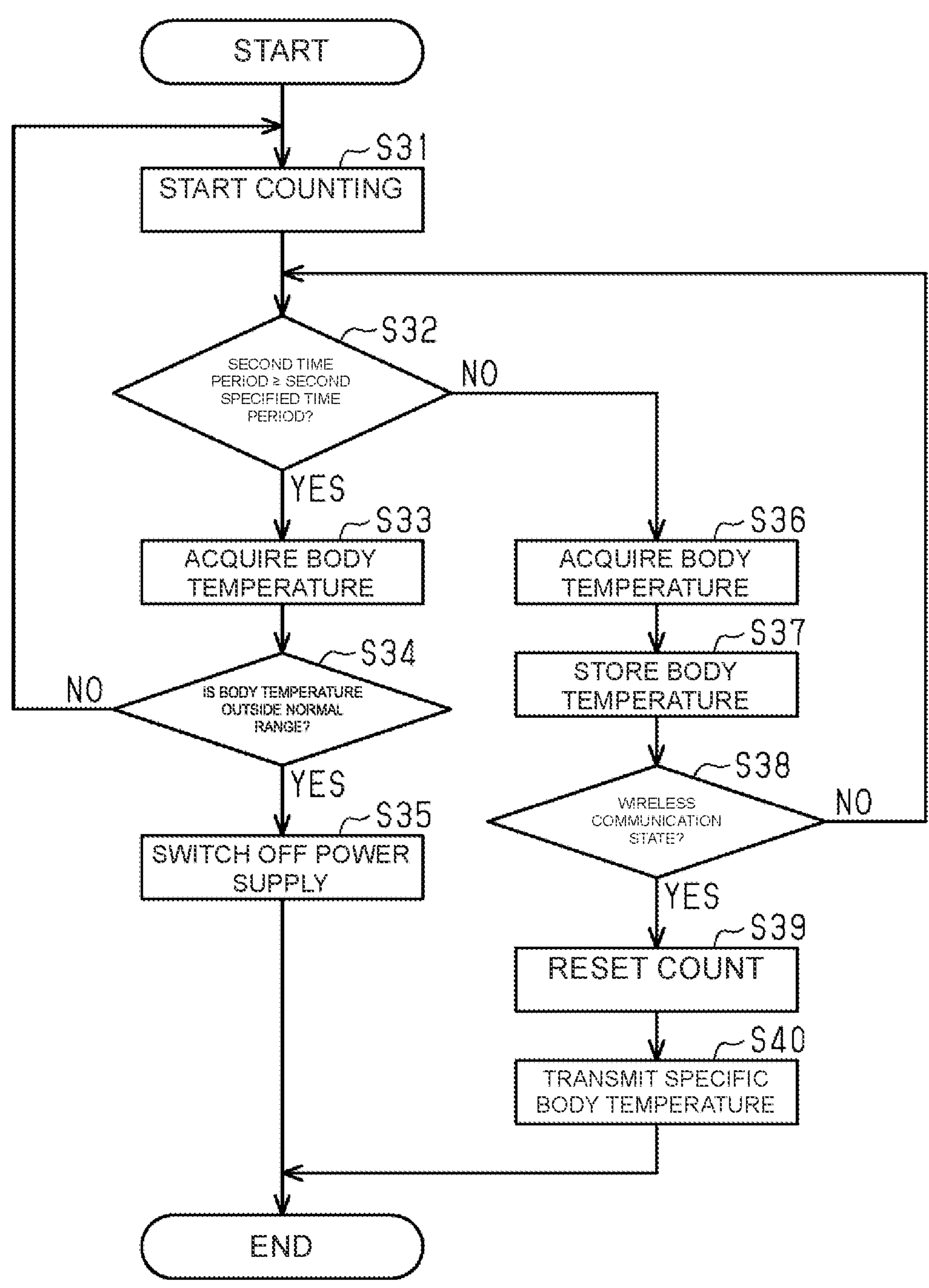
FIG. 5 is a flowchart illustrating a series of processes in biomedical device control for when communication is disrupted.

As illustrated in FIG. 5, when the second controller 16 starts control for when communication is disrupted, the second controller 16 first performs processing in Step S31. In Step S31, the second controller 16 starts counting a second time period. The second time period is a time period in which the second communication unit 14 is in the state of being unable to communicate wirelessly with the data relay device 20. In the present embodiment, the second time period is a time period starting when the second communication unit 14 loses wireless communication with the data relay device 20. Note that the counting may not be performed by the second controller 16, but may be performed by other constituent elements of the biomedical device 10. Thereafter, the second controller 16 performs processing in Step S32.

In Step S32, the second controller 16 determines whether or not the second time period is longer than or equal to a second specified time period, which is predetermined. The second specified time period is, for example, several hours. In a case where a determination of Yes is made in Step S32, the second controller 16 performs processing in Step S33.

In Step S33, the second controller 16 acquires body temperature via the temperature sensor 13. Thereafter, the second controller 16 performs processing in Step S34.

In Step S34, the second controller 16 determines whether or not the acquired body temperature is outside a predetermined normal range. The normal range is defined as a range including body temperatures that can be obtained as human body temperatures. For example, the normal range is predetermined to be higher than or equal to 34 degrees Celsius and less than or equal to 43 degrees Celsius. In a case where a determination of No is made in Step S34, the second controller 16 resets the count. That is, the second controller 16 sets the second time period to zero. The second controller 16 then performs processing in Step S31 again.

In a case where a determination of Yes is made in Step S34, the second controller 16 performs processing in Step S35. In Step S35, the second controller 16 switches the biomedical device 10 from the power-on state to the power-off state. That is, the second controller 16 switches the biomedical device 10 to the power-off state on the condition that the second time period in which the second communication unit 14 is in the state of being unable to communicate wirelessly with the data relay device 20 becomes longer than or equal to the second specified time period. Thereafter, the second controller 16 ends a series of control operations for when communication is disrupted.

In contrast, in a case where a determination of No is made in Step S32, the second controller 16 performs processing in Step S36. In Step S36, the second controller 16 acquires body temperature via the temperature sensor 13. Thereafter, the second controller 16 performs processing in Step S37.

In Step S37, the second controller 16 controls the second storage unit 15 to store the body temperature acquired in Step S36. Thereafter, the second controller 16 performs processing in Step S38.

In Step S38, the second controller 16 determines whether or not the second communication unit 14 has a wireless connection with the data relay device 20. That is, the second controller 16 determines whether or not the second communication unit 14 is reconnected to the data relay device 20. In a case where a determination of No is made in Step S38, the second controller 16 performs processing in Step S32 again. Note that, by repeating processing in Steps S32, S36, and S37 in this manner, the second storage unit 15 stores a plurality of pieces of biometric information acquired from when wireless communication is lost to when wireless communication is regained. Note that the second storage unit 15 may not store all the biometric information for the period of time from when wireless communication is lost to when wireless communication is regained. That is, it is sufficient that the second storage unit 15 store at least part of the biometric information for the period in question. In the following, body temperatures stored in the second storage unit 15 during such a wireless communication unavailable period are referred to as specific body temperatures. The specific body temperatures are an example of specific biometric information.

In a case where a determination of Yes is made in Step S38, the second controller 16 performs processing in Step S39. In Step S39, the second controller 16 resets the count. That is, the second controller 16 sets the second time period to zero. In a case where wireless communication becomes available before the second time period reaches the second specified time period in this manner, the biomedical device 10 remains in the power-on state. Thereafter, the second controller 16 performs processing in Step S40.

In Step S40, the second controller 16 controls the second communication unit 14 to transmit the specific body temperatures to the data relay device 20. That is, when wireless communication is available again, the second communication unit 14 transmits, to the data relay device 20, the specific body temperatures stored in the second storage unit 15 during the period without wireless communication. Thereafter, the second controller 16 ends a series of control operations for when communication is disrupted.

About Data Relay Device Control when Wireless Communication is Unavailable

The first controller 26 of the data relay device 20 performs various processes by executing programs stored in the first storage unit 25 to perform control for when communication is disrupted. When the data relay device 20 is in the power-on state and the communication with the biomedical device 10 is disconnected, the first controller 26 performs, one time, control for when communication is disrupted.

Figure 6:
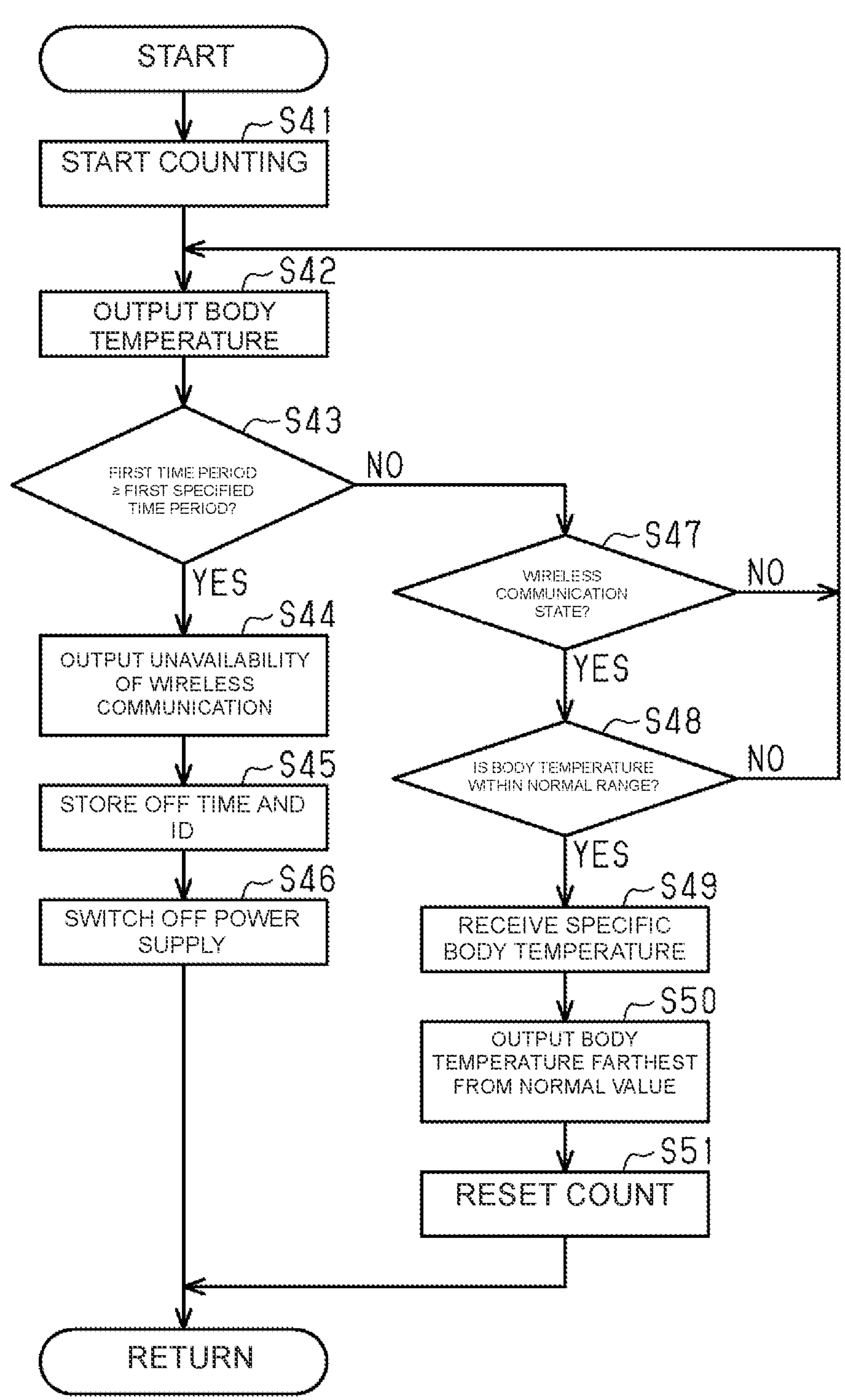
FIG. 6 is a flowchart illustrating a series of processes in data relay device control for when communication is disrupted.

As illustrated in FIG. 6, when the first controller 26 starts control for when communication is disrupted, the first controller 26 first performs control in Step S41. In Step S41, the first controller 26 starts counting a first time period. The first time period is a time period in which the first communication unit 24 is in the state of being unable to communicate wirelessly with the biomedical device 10. Note that the counting may not be performed by the first controller 26, but may be performed by other constituent elements of the data relay device 20. Thereafter, the first controller 26 performs processing in Step S42. Note that in a case where wireless communication is disconnected, the counting will be started after the state is confirmed in which wireless communication is unavailable for a predetermined time period. The predetermined time period includes zero and may be set to, for example, 0 to 5 seconds. That is, with the predetermined time period set to zero, the first time period may be counted from the moment at which wireless communication is disconnected, namely the moment at which control for when communication is disrupted is started. Moreover, with the predetermined time period set to one second, the state is confirmed in which wireless communication is unavailable for one second after the start of control for when communication is disrupted, and thereafter the first time period may be counted.

In Step S42, the first controller 26 controls the output unit 27 to output, to the display 30, the body temperature immediately before wireless communication is lost. That is, the output unit 27 outputs, to the display 30, the latest body temperature received before wireless communication is lost. Note that during the time period in which wireless communication is unavailable, the output unit 27 may keep outputting the value of the body temperature or may temporarily output the value of the body temperature. Thereafter, the first controller 26 performs processing in Step S43.

In Step S43, the first controller 26 determines whether or not the first time period is longer than or equal to a first specified time period, which is predetermined. The first specified time period is set shorter than the second specified time period. For example, the first specified time period is several minutes to several tens of minutes. In a case where a determination of Yes is made in Step S43, the first controller 26 performs processing in Step S44.

In Step S44, the first controller 26 controls the output unit 27 to output, to the display 30, a notification signal indicating that the data relay device 20 cannot wirelessly communicate with the biomedical device 10. Note that the display 30 having received the notification signal displays, for example, a text image and an icon indicating that wireless communication is unavailable. That is, in a case where the first controller 26 switches the data relay device 20 to the power-off state in a state where the first communication unit 24 cannot perform wireless communication, the output unit 27 issues a notification that wireless communication with the biomedical device 10 is lost. Thereafter, the first controller 26 performs processing in Step S45.

In Step S45, the first controller 26 controls the first storage unit 25 to store the current time and ID information for identifying the biomedical device 10 with which the first controller 26 is wirelessly communicating immediately before wireless communication is lost. Note that the first storage unit 25 stores the current time as an OFF time at which the data relay device 20 is switched to the power-off state. Thereafter, the first controller 26 performs processing in Step S46.

In Step S46, the first controller 26 switches the data relay device 20 from the power-on state to the power-off state. That is, the first controller 26 switches the data relay device 20 to the power-off state in a case where the first time period after the first communication unit 24 loses wireless communication with the biomedical device 10 becomes longer than or equal to the first specified time period. By switching the data relay device 20 to the power-off state, the output unit 27 stops outputting biometric information to the display 30. Thereafter, the first controller 26 ends a series of control operations for when communication is disrupted.

In contrast, in a case where a determination of No is made in Step S43, the first controller 26 performs processing in Step S47. In Step S47, the first controller 26 determines whether or not the first communication unit 24 is in the wireless communication state with the biomedical device 10. That is, the first controller 26 determines whether or not the first communication unit 24 has reconnected with the biomedical device 10. In a case where a determination of No is made in Step S47, the first controller 26 performs processing in Step S42 again. In a case where a determination of Yes is made in Step S47, the first controller 26 performs processing in Step S48.

In Step S48, the first controller 26 controls the first communication unit 24 to receive the latest body temperature from the biomedical device 10. The first controller 26 determines whether or not the received body temperature is within the above-described normal range. In a case where a determination of No is made in Step S48, the first controller 26 performs processing in Step S42 again. That is, when the body temperature received by the first communication unit 24 from the biomedical device 10 is outside the normal range, the first controller 26 continues counting the first time period even after wireless communication becomes available.

In a case where a determination of Yes is made in Step S48, the first controller 26 performs processing in Step S49. In Step S49, the first controller 26 controls the first communication unit 24 to receive the above-described specific body temperatures from the biomedical device 10 through wireless communication. Thereafter, the first controller 26 performs processing in Step S50.

In Step S50, the first controller 26 first calculates the absolute value of the difference between each of the values of the specific body temperatures and a normal value. The first controller 26 then controls the output unit 27 to output, to the display 30, the specific body temperature corresponding to the largest difference, namely the specific body temperature farthest from the normal value among the specific body temperatures. Note that the normal value is preset as a numerical value included in the above-descried normal range. The normal value is preset to, for example, 36.5 degrees Celsius as the average value of human body temperature. Thereafter, the first controller 26 performs processing in Step S51.

In Step S51, the first controller 26 resets the count. That is, the first controller 26 sets the first time period to zero. In a case where wireless communication becomes available before the first time period reaches the first specified time period in this manner, the data relay device 20 remains in the power-on state. The first controller 26 then ends a series of control operations for when communication is disrupted.

About Device Search Control

The first controller 26 of the data relay device 20 performs various processes by executing programs stored in the first storage unit 25 to perform device search control. The first controller 26 performs the device search control only once when the data relay device 20 is switched to the power-on state after the data relay device 20 is put in the power-off state by performing the above-described control for when communication is disrupted.

Figure 7:
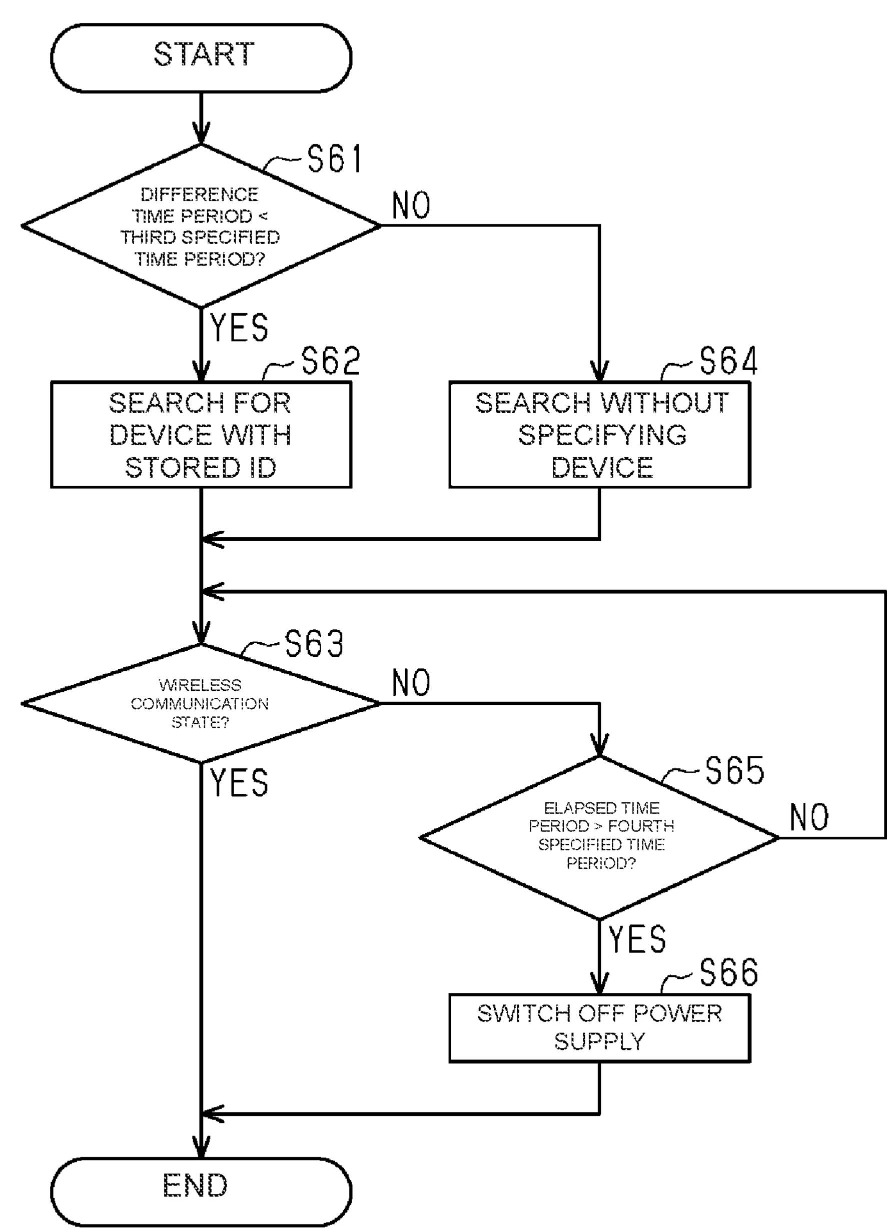
FIG. 7 is a flowchart illustrating a series of processes in device search control.

As illustrated in FIG. 7, when the first controller 26 starts the device search control, the first controller 26 first performs processing in Step S61. In Step S61, the first controller 26 acquires the current time as a time at which the data relay device 20 is switched to the power-on state. The first controller 26 calculates a difference time period that is the difference between the current time and the OFF time acquired in the control of the data relay device 20 for when communication is disrupted. The first controller 26 then determines whether or not the difference time period is less than a third specified time period. The third specified time period is predetermined as a time period indicating that the data relay device 20 shifts from the power-off state to the power-on state in a short period of time. For example, the third specified time period is several minutes. In a case where a determination of Yes is made in Step S61, the first controller 26 performs processing in Step S62.

In Step S62, the first controller 26 controls the first communication unit 24 to search for, as a new connection destination for wireless communication, the biomedical device 10 corresponding to the ID information stored in the control of the data relay device 20 for when communication is disrupted. That is, the first communication unit 24 does not recognize, as a connection destination for wireless communication, a biomedical device 10 that does not correspond to the ID information described above even in a case where the biomedical device 10 exists within the range of wireless communication. Thereafter, the first controller 26 performs processing in Step S63.

In Step S63, the first controller 26 determines whether or not the first communication unit 24 is in the wireless communication state with the biomedical device 10. That is, the first controller 26 determines whether or not the first communication unit 24 has connected with the biomedical device 10. In a case where a determination of Yes is made in Step S63, the first controller 26 ends a series of device search control operations.

In a case where a determination of No is made in Step S61, the first controller 26 performs processing in Step S64. In step S64, the first communication unit 24 searches for any one of the biomedical devices 10 as a new connection destination for wireless communication without specifying the biomedical device 10. Thereafter, the first controller 26 performs processing in Step S63.

In a case where a determination of No is made in Step S63, the first controller 26 performs processing in Step S65. In Step S65, the first controller 26 acquires the current time. The first controller 26 calculates an elapsed time period that is the difference between the current time acquired in Step S65, namely the time at which switching to the power-on state is performed, and the current time. The first controller 26 then determines whether or not the elapsed time period is longer than a fourth specified time period. The fourth specified time period is preset to, for example, several tens of minutes. In a case where a determination of No is made in Step S65, the first controller 26 performs processing in Step S63 again.

In contrast, in a case where a determination of Yes is made in Step S65, the first controller 26 performs processing in Step S66. In Step S66, the first controller 26 switches the data relay device 20 from the power-on state to the power-off state. Thereafter, the first controller 26 ends a series of device search control operations.

Operations of Present Embodiments

When wireless communication with the biomedical device 10 is established, the data relay device 20 continues receiving body temperature as biometric information from the biomedical device 10. Note that the data relay device 20 may temporarily lose wireless communication with the biomedical device 10 in a case where the user with the biomedical device 10 moves or in a case where there is an obstacle between the data relay device 20 and the biomedical device 10. Moreover, also when the power supply of the biomedical device 10 is switched to the OFF state, the data relay device 20 cannot communicate wirelessly with the biomedical device 10.

Effects of Present Embodiments (1) According to the above-described embodiments, the output unit 27 continues outputting the body temperature to the display 30 even in a case where the first communication unit 24 loses communication with the biomedical device 10. That is, the body temperature is securely displayed on the display 30. Furthermore, the data relay device 20 enters the power-off state when the first time period in which wireless communication with the biomedical device 10 is unavailable becomes longer than or equal to the first specified time period. Thus, a situation does not occur in which the data relay device 20 keeps outputting body temperature to the display 30 for an excessively long period of time even though the data relay device 20 does not receive body temperature from the biomedical device 10. Moreover, the data relay device 20 is prevented from consuming power unnecessarily. The data relay device 20 remains in the power-on state in a case where the data relay device 20 reconnects with the biomedical device 10 before the first time period reaches the first specified time period. Thus, according to the above-described embodiments, the data relay device 20 can be prevented from switching to the OFF state unnecessarily.

(2) According to the above-described embodiments, in a case where a state continues in which the biomedical device 10 and the data relay device 20 cannot wirelessly communicate with each other, the data relay device 20 switches to the power-off state first. Thus, the power consumption of the data relay device 20 can be reduced, which is responsible for the output of the body temperature in addition to the reception of the body temperature and thus has relatively high power consumption.

(3) In a case where the body temperature received from the biomedical device 10 is outside the normal range, a situation is conceivable where the biomedical device 10 is not properly attached to the subject to be measured or a situation is conceivable where the data relay device 20 is wirelessly connected to another biomedical device 10 that is unintended. If wireless communication is continued between the data relay device 20 and the biomedical device 10 even in such a case, the first battery 23 of the data relay device 20 will consume power unnecessarily. In the above-described embodiments, in Step S48 of the control of the data relay device 20 for when communication is disrupted, the first controller 26 continues counting the first time period when the body temperature received by the first communication unit 24 from the biomedical device 10 is outside the normal range. In other words, the first controller 26 considers that a wireless connection is not established in a case where the data relay device 20 is wirelessly connected to the biomedical device 10 that detects a body temperature outside the normal range. This configuration can prevent the data relay device 20 from unnecessarily consuming power by remaining wirelessly connected to an unintended biomedical device 10 in the case of reconnection.

(4) In the above-described embodiments, for example, suppose that during the period in which the biomedical device 10 and the data relay device 20 cannot wirelessly communicate with each other, the condition of the user to be measured becomes unstable, and values away from the normal value are obtained as the body temperature. In this case, according to the above-described embodiments, the body temperatures that are far from the normal value are stored as specific body temperatures in the second storage unit 15 of the biomedical device 10 and thereafter are transmitted to the data relay device 20. The specific body temperature that is farthest from the normal value is outputted from the data relay device 20 to the display 30. Thus, even on the display 30 side, it is possible to know that body temperatures far from the normal value are obtained during the wireless communication unavailable period.

(5) In the above-described embodiment, even in a case where the biomedical device 10 acquires many body temperatures during the period in which the biomedical device 10 and the data relay device 20 cannot wirelessly communicate with each other, the data relay device 20 displays only the specific body temperature farthest from the normal value at the time of reconnection. By limiting the body temperature to be displayed to the specific body temperature that is farthest from the normal value in this manner, the display of a highly important body temperature can be prevented from being confused with the display of other body temperatures.

(6) In the above-described embodiments, in a case where the difference time period is less than the third specified time period, it is assumed that the data relay device 20 shifts from the power-off state to the power-on state in a short period of time. As such a situation, a situation is conceivable in which even though the measurer is continuously using the data relay device 20, the data relay device 20 is switched to the power-off state, and immediately thereafter the data relay device 20 is switched to the power-on state. In the above-described embodiments, on the condition that the difference time period is less than the third specified time period, the biomedical device 10 corresponding to the ID information stored in the first storage unit 25 is searched for as a new wireless communication connection destination. Thus, in the above-described situation, the data relay device 20 can quickly establish wireless communication with the biomedical device 10 that is connected before entering the power-off state.

(7) In the above-described embodiments, in a case where the data relay device 20 is to be switched to the power-off state in a state where wireless communication is unavailable, the output unit 27 outputs, to the display 30, a notification signal indicating that wireless communication is lost. With this configuration, the measurer can determine that the data relay device 20 is not in the power-off state for other reasons, such as failure.

(8) In a case where the body temperature acquired by the biomedical device 10 is within the normal range, it is assumed that the biomedical device 10 is still attached to the subject to be measured. Thus, when the body temperature obtained by the biomedical device 10 that is out of wireless communication is within the normal range, it is preferable to leave the possibility of wireless communication with the data relay device 20. In the above-described embodiments, even in a case where the second time period becomes longer than or equal to the second specified time period in the control of the biomedical device 10 for when communication is disrupted, if the acquired body temperature is within the normal range, the second controller 16 resets the count and starts counting again. That is, in the above-described embodiments, the biomedical device 10 can leave the possibility of wireless communication with the data relay device 20 as much as possible.

(9) In the present embodiments, the data relay device 20 is switched to the power-off state in a case where the elapsed time period is longer than the fourth specified time period in the device search control. With this configuration, the data relay device 20 can be prevented from being in the power-on state for a long period of time even though the data relay device 20 is not connected to any biomedical device 10.

Modification Examples

The present embodiment can be implemented with the following modifications. The present embodiment and the following modification examples may be implemented in combination with each other to the extent that they are technically consistent.

* The biomedical device 10 is not limited to those that are attached to the subject to be measured with the attaching sheet 11 interposed therebetween. * The communication method between the biomedical device 10 and the data relay device 20 is not limited to the example in the above-described embodiments. The wireless communication method between the biomedical device 10 and the data relay device 20 may be ZigBee® or wireless LAN.

* The biometric information may be, for example, blood pressure, blood glucose, oxygen saturation, heart rate, pulse rate, or the like, or may include several of these. Note that in a case where the biometric information includes these parameters, it is sufficient that the first controller 26 have normal ranges and normal values for these parameters.

* The data relay device 20 is not limited to those that output biometric information using the output terminal 22. For example, the data relay device 20 may output biometric information to the display 30 while being connected to the display 30 in a wired manner. Moreover, for example, the data relay device 20 may output biometric information to the display 30 through wireless communication.

* The normal value and the normal range in the above-described embodiments are not limited to the examples in the above-described embodiments. For example, the normal range may be a range with no upper limit, such as "34 degrees Celsius or higher". * The second controller 16 can omit processing in Steps S33 and S34 in the control of the biomedical device 10 for when communication is disrupted. That is, the second controller 16 may unconditionally switch the biomedical device 10 to the power-off state in a case where the second time period becomes longer than or equal to the second specified time period.

* The second controller 16 can omit processing in Steps S36, S37, and S40 in the control of the biomedical device 10 for when communication is disrupted. That is, in a case where the second time period is less than the second specified time period, the biomedical device 10 may not acquire, store, or transmit the body temperature.

* The body temperature outputted in Step S42 is not limited to the body temperature immediately before wireless communication is lost. It is sufficient that the body temperature be a body temperature that is received during wireless communication, and the average value of the received body temperatures over a predetermined period of time may be outputted, for example.

* The first controller 26 can omit processing in Steps S44 and S45 in the control of the data relay device 20 for when communication is disrupted. That is, the first controller 26 may unconditionally switch the data relay device 20 to the power-off state in a case where the first time period becomes longer than or equal to the first specified time period.

* The timing to start counting the first time period can be any time in a state where wireless communication is unavailable. That is, in Step S41 of the above-described embodiments, the predetermined time period may be set to 0 to 5 seconds, which is an example. In this regard, the same also applies to the timing to start counting the second time period.

* The first specified time period may be equal to the second specified time period. Moreover, the first specified time period may be longer than the second specified time period. Note that it is desirable that the first specified time period be shorter than the second specified time period in order to reduce the power consumption of the data relay device 20.

* The first controller 26 can omit processing in Steps S48, S49, and S50 in the control of the data relay device 20 for when communication is disrupted. That is, in a case where the first time period is less than the first specified time period, the data relay device 20 may not receive or output the body temperature.

* In Step S50 of the control of the data relay device 20 for when communication is disrupted, the method of selecting the specific body temperature farthest from the normal value is not limited to the difference from the normal value. For example, the first controller 26 may calculate the ratio of each specific body temperature value to the normal value and select, in accordance with the ratio, the specific body temperature farthest from the normal value among the specific body temperatures.

* The specific body temperature outputted by the first controller 26 in Step S50 of the control of the data relay device 20 for when communication is disrupted is not limited to the body temperature farthest from the normal value. For example, the output unit 27 may output only the latest specific body temperature among the specific body temperatures. The output unit 27 may output a plurality of specific body temperatures continuously.

* The first controller 26 may stop a search for a biomedical device 10 in a case where no wireless communication state is established in the device search control and where the elapsed time period is longer than a fifth specified time period, which is a predetermined period shorter than the fourth specified time period. With this configuration, a state where wireless communication is not performed can be prevented from lasting for a long period of time. Moreover, the data relay device 20 may have a switch, which is not illustrated, and may start a search, which is stopped, for a biomedical device 10 through operation of the switch.

* The first controller 26 can omit the device search control. In this case, it is sufficient that whether or not to conduct a search for a biomedical device 10 on the basis of the ID information when the data relay device 20 is switched to the power-on state be preset.

Note

The technical concepts that can be derived from the embodiments and modification examples described above are described below.

[1] A biomedical data relay device includes a first battery that supplies power, a first communication unit capable of receiving, through wireless communication, biometric information from a biomedical device that acquires the biometric information, an output unit capable of outputting the biometric information received by the first communication unit to another external device different from the biomedical device, and a first controller that controls switching between a power-on state and a power-off state. The first controller controls, in a case where the first communication unit loses wireless communication with the biomedical device, the output unit so as to output the received biometric information to the external device, and counts a first time period in which the first communication unit is in a state of being unable to communicate wirelessly with the biomedical device, maintains the power-on state in a case where wireless communication becomes available before the first time period reaches a first specified time period, which is predetermined, and performs switching from the power-on state to the power-off state to stop outputting the biometric information to the external device in a case where the first time period becomes longer than or equal to the first specified time period.

[2] A biomedical-device wireless communication system includes a biomedical device that acquires biometric information, and a biomedical data relay device capable of wirelessly communicating with the biomedical device. The biomedical data relay device includes a first battery that supplies power, a first communication unit capable of receiving the biometric information from the biomedical device through wireless communication, an output unit capable of outputting the biometric information received by the first communication unit to another external device different from the biomedical device, and a first controller that controls switching between a power-on state of the biomedical data relay device and a power-off state of the biomedical data relay device. The biomedical device includes a second battery that supplies power, a second communication unit capable of transmitting the acquired biometric information through wireless communication, and a second controller that controls switching between a power-on state of the biomedical device and a power-off state of the biomedical device. The biomedical device counts a second time period in which the second communication unit is in a state of being unable to communicate wirelessly with the biomedical data relay device, remains in the power-on state in a case where wireless communication becomes available before the second time period reaches a second specified time period, which is predetermined, and switches from the power-on state to the power-off state on a condition that the second time period becomes longer than or equal to the second specified time period. The biomedical data relay device controls, in a case where the first communication unit loses wireless communication with the biomedical device, the output unit so as to output the received biometric information to the external device, and counts a first time period in which the first communication unit is in a state of being unable to communicate wirelessly with the biomedical device, remains in the power-on state in a case where wireless communication becomes available before the first time period reaches a first specified time period, which is predetermined, and switches from the power-on state to the power-off state to stop outputting the biometric information to the external device in a case where the first time period becomes longer than or equal to the first specified time period.

[3] Regarding the biomedical-device wireless communication system described in [2], the first specified time period is set shorter than the second specified time period.

[4] Regarding the biomedical-device wireless communication system described in [2] or [3], in a case where the first communication unit loses wireless communication with the biomedical device and thereafter regains wireless communication, whether or not the biometric information received by the first communication unit from the biomedical device is outside a predetermined normal range is checked and, in a case where the biometric information is outside the normal range, the first time period is counted even after wireless communication with the biomedical device becomes available.

[5] Regarding the biomedical-device wireless communication system described in any one of [2] to [4], the biomedical data relay device further includes a first storage unit capable of storing data, and the first storage unit stores an OFF time at which the first controller switches the biomedical data relay device to the power-off state and ID information for identifying the biomedical device that is in wireless communication with the biomedical data relay device immediately before wireless communication is lost. When the first controller switches the biomedical data relay device from the power-off state to the power-on state, the first communication unit searches for the biomedical device corresponding to the ID information stored in the first storage unit as a new wireless communication connection destination on a condition that a difference between a time of switching to the power-on state and the OFF time is less than a third specified time period, which is predetermined, and on a condition that the difference between the time of switching to the power-on state and the OFF time is greater than or equal to the third specified time period, searches for, as a new connection destination for wireless communication, any one of biomedical devices including the biomedical device without specifying the biomedical device.

[6] Regarding the biomedical-device wireless communication system described in any one of [2] to [5], the biomedical device further includes a second storage unit capable of storing data. The second storage unit stores, in a case where the second communication unit loses wireless communication with the biomedical data relay device, at least part of the biometric information acquired from when the second communication unit loses wireless communication to when the second communication unit regains wireless communication. When regaining wireless communication, the first communication unit transmits, as specific biometric information, the biometric information stored in the second storage unit during a wireless communication unavailable period, to the biomedical data relay device, and the output unit outputs, to the external device, biometric information farthest from a predetermined normal value in the specific biometric information.

[7] Regarding the biomedical-device wireless communication system described in any one of [2] to [6], in a case where the first controller switches the biomedical data relay device to the power-off state in a state where the first communication unit is unable to communicate wirelessly, the output unit outputs, to the external device, a notification signal indicating that wireless communication with the biomedical device is unavailable.

[8] Regarding the biomedical data relay device described in [1], in a case where the first communication unit loses wireless communication with the biomedical device and thereafter regains wireless communication, whether or not the biometric information received by the first communication unit from the biomedical device is outside a predetermined normal range is checked and, in a case where the biometric information is outside the normal range, the first time period is counted even after wireless communication with the biomedical device becomes available.

[9] Regarding the biomedical data relay device described in [1] or [8], in a case where the first controller performs switching to the power-off state in a state where the first communication unit is unable to communicate wirelessly, the output unit outputs, to the external device, a notification signal indicating that wireless communication with the biomedical device is unavailable.

What is claimed is:

1. A biomedical data relay device comprising:

a first battery configured to supply power;

a receiver configured to receive, through wireless communication, biometric information from a biomedical device that is configured to acquire the biometric information;

an output controller configured to output the biometric information received by the receiver to another external device different from the biomedical device; and a first controller that is configured to:

switch the biomedical relay device between a power-on state and a power-off state, when the receiver loses wireless communication with the biomedical device, cause the output controller to output the received biometric information to the external device, count a first time period in which the receiver is in a state of being unable to communicate wirelessly with the biomedical device, maintain the power-on state when wireless communication becomes available before the first time period reaches a first predetermined time period, and switch from the power-on state to the power-off state such that the output controller stops outputting the biometric information to the external device when the first time period becomes longer than or equal to the first predetermined time period.

2. The biomedical data relay device according to claim 1, wherein when the receiver loses wireless communication with the biomedical device and thereafter regains wireless communication, the biomedical relay device is configured to check whether or not the biometric information received by the receiver from the biomedical device is outside a predetermined normal range, and wherein when the biometric information is outside the normal range, the biomedical data relay device is configured to count the first time period even after wireless communication with the biomedical device becomes available.

3. The biomedical data relay device according to claim 1, wherein when the first controller switches the biomedical relay device to the power-off state when the receiver is unable to communicate wirelessly, the output controller is configured to output, to the external device, a notification signal indicating that wireless communication with the biomedical device is unavailable.

4. A biomedical-device wireless communication system comprising:

a biomedical device configured to acquire biometric information; and a biomedical data relay device configured to wirelessly communicate with the biomedical device, wherein the biomedical data relay device comprises:

a first battery configured to supply power, a receiver configured to receive, through wireless communication, the biometric information from the biomedical device, an output controller configured to output the biometric information received by the first receiver to another external device different from the biomedical device, and a first controller configured to switch the biomedical relay device between a power-on state and a power-off state, and wherein the biomedical device comprises:

a second battery configured to supply power, a transmitter configured to transmit the acquired biometric information through wireless communication, and a second controller configured to switch the biomedical device between a power-on state and a power-off state, wherein the biomedical device is configured to:

count a second time period in which the transmitter is in a state of being unable to communicate wirelessly with the biomedical data relay device, remain in the power-on state when wireless communication becomes available before the second time period reaches a second predetermined time period, and switch from the power-on state to the power-off state when the second time period becomes longer than or equal to the second predetermined time period, and wherein the biomedical data relay device is configured to:

control the output controller so as to output the received biometric information to the external device when the receiver loses wireless communication with the biomedical device, count a first time period in which the receiver is in a state of being unable to communicate wirelessly with the biomedical device, remain in the power-on state when wireless communication becomes available before the first time period reaches a first predetermined time period, and switch from the power-on state to the power-off state and stop outputting the biometric information to the external device when the first time period becomes longer than or equal to the first predetermined time period.

5. The biomedical-device wireless communication system according to claim 4, wherein the first predetermined time period is shorter than the second predetermined time period.

6. The biomedical-device wireless communication system according to claim 4, wherein when the receiver loses wireless communication with the biomedical device and thereafter regains wireless communication, the biomedical relay device is configured to check whether or not the biometric information received by the receiver from the biomedical device is outside a predetermined normal range, and wherein when the biometric information is outside the normal range, the biomedical relay device is configured to count the first time period even after wireless communication with the biomedical device becomes available.

7. The biomedical-device wireless communication system according to claim 4, wherein the biomedical data relay device further comprises a first storage configured to store data, wherein the first storage is configured to store an OFF time at which the first controller switched the biomedical data relay device to the power-off state, and ID information for identifying the biomedical device that was in wireless communication with the biomedical data relay device immediately before wireless communication was lost, and wherein when the first controller switches the biomedical data relay device from the power-off state to the power-on state, the receiver is configured to:

search for the biomedical device corresponding to the ID information stored in the first storage as a new wireless communication connection destination when a difference between a time of switching to the power-on state and the OFF time is less than a third predetermined time period, and when the difference between the time of switching to the power-on state and the OFF time is greater than or equal to the third predetermined time period, search for, as a new connection destination for wireless communication, any one of a plurality of biomedical devices including the biomedical device without specifying the biomedical device.

8. The biomedical-device wireless communication system according to claim 4, wherein the biomedical device further comprises a second storage configured to store data, wherein, when the transmitter loses wireless communication with the biomedical data relay device, the second storage is configured to store at least part of the biometric information acquired between a time when the transmitter loses wireless communication and a time when the transmitter regains wireless communication, wherein when regaining wireless communication, the transmitter is configured to transmits, as specific biometric information, the biometric information stored in the second storage during a wireless communication unavailable period to the biomedical data relay device, and wherein the output controller is configured to output, to the external device, biometric information farthest from a predetermined normal value in the specific biometric information.

9. The biomedical-device wireless communication system according to claim 4, wherein when the first controller switches the biomedical data relay device to the power-off state when the receiver is unable to communicate wirelessly, the output controller is further configured to output, to the external device, a notification signal indicating that wireless communication with the biomedical device is unavailable.

* * * * *